Jan. 25, 1949.     A. C. WEIBY     2,460,049
MILK PAIL COVER

Filed Jan. 9, 1946     2 Sheets-Sheet 1

Inventor
ALFRED C. WEIBY

By Carlsen & Hagle
Attorney

Jan. 25, 1949.   A. C. WEIBY   2,460,049
MILK PAIL COVER
Filed Jan. 9, 1946   2 Sheets-Sheet 2

Inventor
ALFRED C. WEIBY
By Carlsen + Hoyle
Attorney

Patented Jan. 25, 1949

2,460,049

UNITED STATES PATENT OFFICE 2,460,049

MILK PAIL COVER

Alfred C. Weiby, Minneapolis, Minn., assignor to Solar Corporation, Milwaukee, Wis.

Application January 9, 1946, Serial No. 639,917

8 Claims. (Cl. 31—61)

This invention relates generally to improvements in milking machines and more particularly to the covers or lids used on the milk pails in such machines.

The ordinary milking machine includes as its essential elements a vacuum pump, pulsator, milk pail, teat cups and attendant connecting pipes and tubes. In most such prior machines with which I am familiar the pulsator is mounted upon the cover or lid for the milk pail but some advantages are obtained by locating the pulsator remotely from the milk pail, as shown, for example, in the N. J. Daysh Patent No. 1,276,184, issued August 20, 1918.

Since the milk pail cover then no longer carries the pulsator I have invented a new cover construction and arrangement and it is the primary object of this invention to provide a cover having the necessary connections for vacuum, pulsing and milk tubes all arranged for the maximum ease and convenience in making the necessary connections and with convenient controls for both milk and vacuum flow. Another object is to provide a cover so arranged that shutting off the pulsing vacuum to the teat cups will maintain a vacuum inside the pail. Still another object is to provide a cover of this kind in a simple, neat and inexpensive form and one which is readily kept clean and sanitary.

These and other more detailed and specific objects will be disclosed in the course of the following specification, reference being had to the accompanying drawings, in which—

Figure 3:
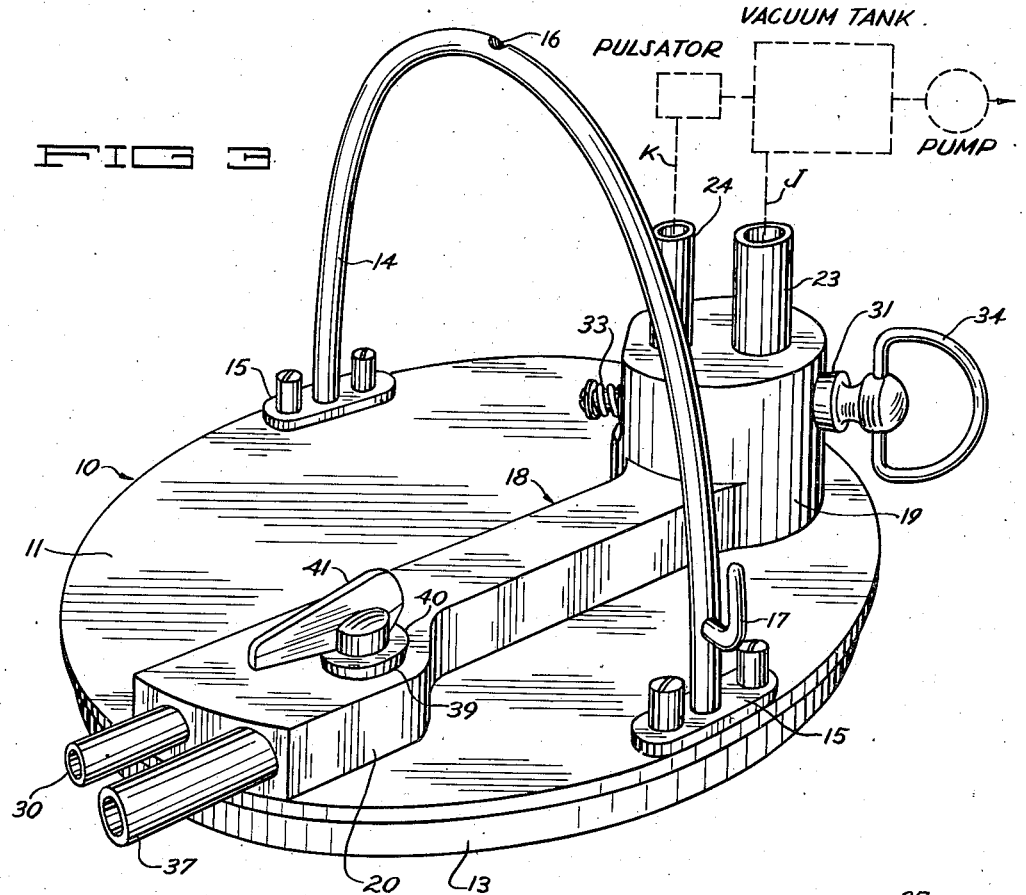
Fig. 3 is an enlarged perspective view of the cover alone. This view also illustrates diagrammatically the connections between the cover and the rest of the system not appearing in Fig. 1 and including the pulsator, vacuum tank and vacuum pump.

Referring now more particularly and by reference characters to the drawing, A designates the usual milk pail to which is connected the usual teat cup group or assembly B. Said teat cup assembly B comprises four teat cups C each of which has connected thereto a pulsing tube D leading to its massaging chamber and milk tube E leading to its milking chamber in usual manner. These tubes are all connected to a claw F which serves to connect all four pulsing tubes to a single tube G leading to the pail, and likewise connects all of the milk tubes E to a single milk tube H leading to the pail. In operation, by means of a vacuum pump, tank and pulsator, shown diagrammatically in Fig. 3, a constant vacuum is maintained in the milk tubes E and H and in the pail A so that milk is drawn from the teats over which the teat cups are placed, while intermittent suction is applied to the pulsing tubes D and G to massage the teats.

Ordinarily the pulsator is provided on the milk pail cover but in accordance with my invention the pulsator is remotely located and as a result the milk pail cover, designated generally at 10, is of new and advantageous design as will now be described.

The milk pail A has a neck portion terminating in an upward opening having a flanged mouth A' and the cover 10 comprises as its basic or foundation part a circular, disk-like plate or base 11 adapted to nicely fit over and close said opening. The underside of the cover has a depending circular flange or rim 12 (Figs. 2 and 4) about which fits an annular resilient sealing gasket 13 which fits the flanged opening A'.

To hold the cover tightly in place on the pail when it is carried about, the cover is provided with an upwardly arched handle 14 secured at its ends at 15 to the plate 11 and centrally notched at 16 for engagement by a conventional bail I on the pail. When this bail is swung upward it fits nicely into the notch 16 and holds the cover down as will be readily understood and as is usual in such machines. Of course, when operating the cover is also held tightly to its seat by the vacuum in the pail. The handle 14 also, as usual, has a hook 17 at one or either side to receive the claw F by which the teat tube assembly may be supported when not in use.

Figure 4:
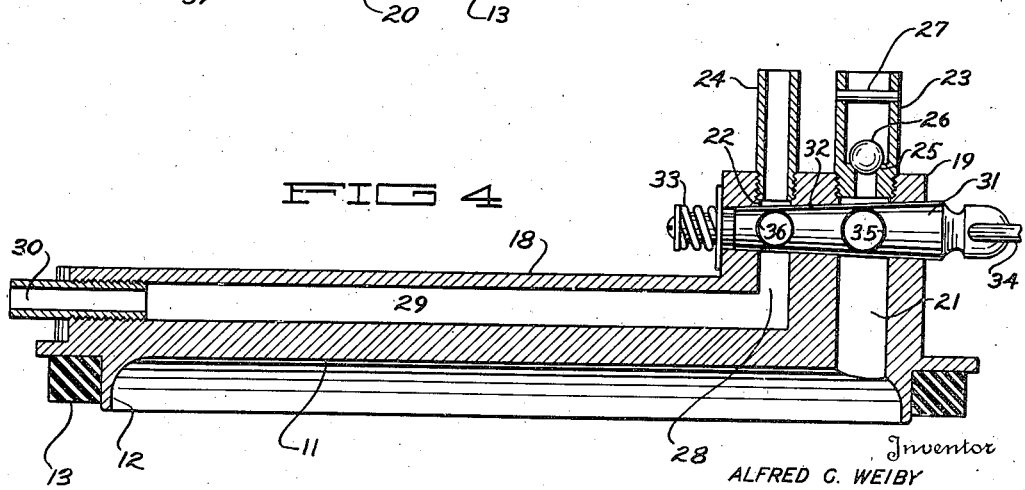
Fig. 4 is a sectional view along an irregular diametrical line showing the pulsing and vacuum connections and control and check valves in the cover.

On the upper surface of the plate 11 extending generally crosswise thereof, there is integrally formed or cast a valve housing indicated generally at 18, the opposite ends 19 and 20 of which are enlarged. The end 19, which may be termed the suction inlet end, is also increased in height and, as seen in Fig. 4 to best advantage, has two openings 21 and 22 bored vertically therein. The upper ends of these openings 21 and 22 have threaded therein nipples or tubular fittings 23 and 24 over which may be readily slipped the ends of tubes J and K leading to the vacuum pump and pulsator. The opening 21 extends clear through to the underside of the cover, thus communicating with the interior of the pail, and it is to the nipple 23 in this opening that the constant vacuum tube J from the pump (or vacuum tank) leads.

The nipple or fitting 23 also operates as, or contains a check valve, and for this purpose is diametrically reduced near its bottom to form an internal, annular seat 25 for a valve ball 26. The ball will obviously be unseated when vacuum is present in tube J to thus provide vacuum in the pail, but will reseat itself and maintain such vacuum in the pail, should the pump or tank fail or the pump be stopped. The ball 26 is prevented from escaping when the cover is removed and handled, by means of a pin 27 extending diametrically through the nipple some distance above the seated position of the ball.

The opening 22 does not extend through the cover but turns at right angles at 28 and extends as at 29 lengthwise through the housing 18 and out through the outer face of the end 20. The extremity of the opening or passage 29 is tapped to receive a nipple 30 over which the pulsing tube G leading to the claw F is slipped, and accordingly the tube K leading to the pulsator is attached to the nipple 24 as seen in Fig. 1.

Flow through both of the openings 21 and 22 is controlled by a rotary valve cock 31 which is seated in a tapered, through recess 32 provided therefor, crossing the openings and extending at opposite ends through the valve housing. The usual spring 33 holds the valve to its seat and a handle 34 is provided for rotating the valve. In line with the openings 21 and 22 the valve has diametrically extending ports 35 and 36 which may be turned crosswise, as seen in Fig. 4, to shut off flow through the openings and may be turned in line therewith to regulate and permit said flow.

Figures 1, 2:
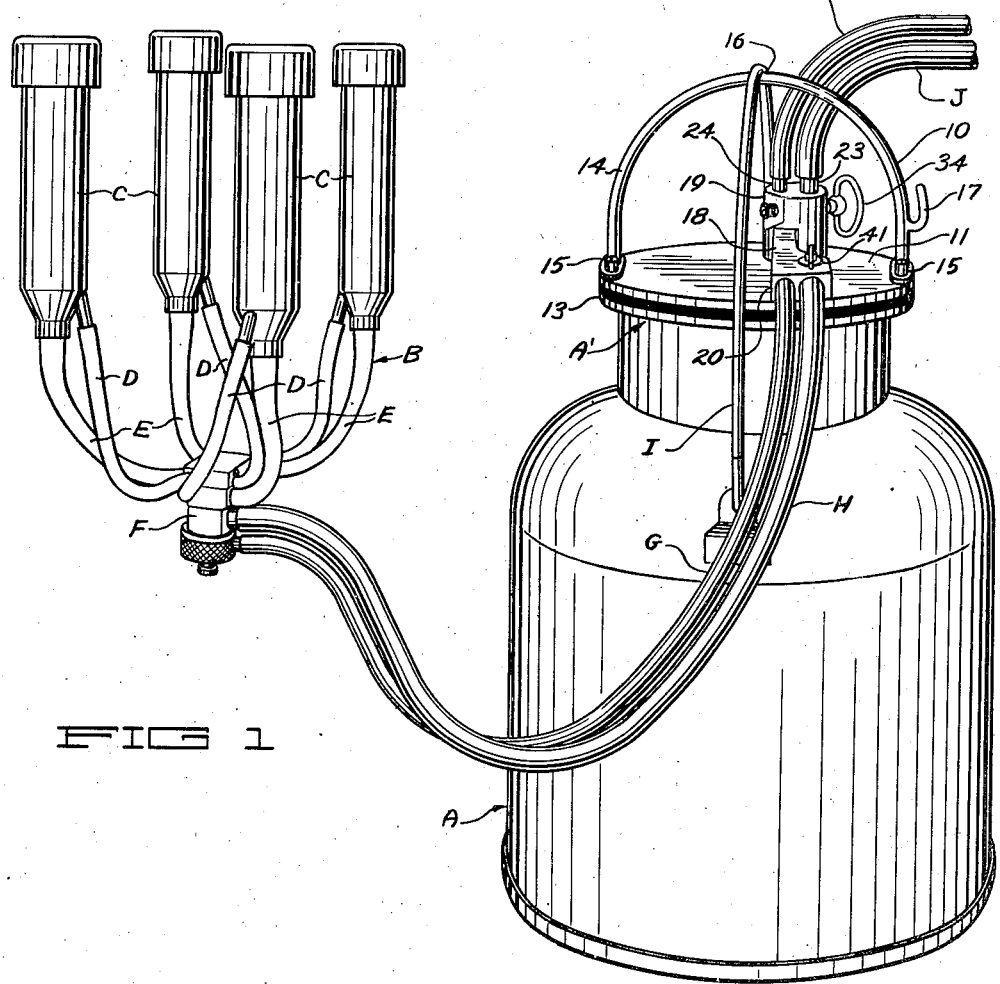
Fig. 1 is a perspective view of a milk pail and teat cup assembly showing the arrangement of and connections to my improved milk pail cover.
Fig. 2 is an enlarged fragmentary sectional detail view showing the milk valve and associated parts.

The milk tube H from the claw F is fitted over a nipple 37 alongside the aforesaid nipple 30 and, as best shown in Fig. 2, this nipple is screwed into the outer open end of a milk port or opening 38 formed in the valve housing end 20. This port 38 radially enters a downwardly tapering valve seat or chamber 39 which passes entirely through the cover and in this seat there is placed a plug valve 40 having a handle 41 on its upper end.

The valve 40 has a radially and downwardly opening notch 42 which, when brought to registry with the port 38, will connect the milk tube H to the interior of the pail. When the valve is turned at right angles by the handle 41 the milk tube will, of course, be isolated from the pail.

In operation, when the valves 31 and 40 are opened pulsations will be applied to the teat cups through the pulsing tubes G and D and constant vacuum will flow to the cups through the tube J, the pail, the valve 40 and the tubes H and E. Milk will then be drawn from the teats and deposited in the pail through the valve 40. At any time the valve 31 may be closed to stop the entire operation and when this is done vacuum will be maintained for some time in the pail.

The cover thus constructed is obviously simple, inexpensive and easy to keep in a sanitary condition, while convenient controls are present for all operations.

It will be noted that the valve housing 18 extends across the cover in an off-center position (Fig. 1) and that the various tubes G, H, J and K will nicely clear the bail I when it is swung up to clamp the cover in place.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a milking machine, a milk pail including a cover having means for connecting teat cups to the pail, and means for making connections between the pail and a suction source and also between a remotely located pulsator and the teat cups, a dual valve on the cover for simultaneously opening and closing the connection means between the pail and suction source and between the pulsator and teat cups, and a separate valve for opening and closing the said connection between the pail and teat cups.

2. In a milking machine, a milk pail including a cover having means for connecting teat cups to the pail, and means for making connections between the pail and a suction source and also between a remotely located pulsator and the teat cups, valve means for simultaneously opening and closing the said connections between the pail and suction source and between the pulsator and teat cups, and another valve means for separately opening and closing the said connection between the pail and teat cups.

3. In a milking machine, a milk pail including a cover having means for connecting teat cups to the pail, and means for making connections between the pail and a suction source and also between a remotely located pulsator and the teat cups, a dual valve on the cover for simultaneously opening and closing the connection means between the pail and suction source and between the pulsator and teat cups, a separate valve for opening and closing the said connection between the pail and teat cups, and a suction opened check valve connected between the dual valve and suction source.

4. In a milking machine having a conventional milk pail, a pulsator, a suction source, a teat cup group and a milk tube and a pulsing tube leading toward the pail from the teat cup group and a suction tube and a pulsing tube leading toward the pail from the suction source and pulsator, the improvement which consists in a cover for the milk pail having two nipples at one side for connection to the milk tube and first mentioned pulsing tube and another pair of nipples for connection to the suction tube and second mentioned pulsing tube, the cover having a channel connecting the two nipples for the pulsing tubes, the cover also having an opening connecting the interior of the pail to the nipple for the suction tube, and another opening connecting the interior of the milk pail to the nipple for the milk tube, a manually operative valve in the last mentioned opening, and a second valve operative in the said channel and the opening to the suction tube nipple for simultaneously closing the channel and this opening.

5. In a milking machine having a conventional milk pail, a pulsator, a suction source, a teat cup group and a milk tube and a pulsing tube leading toward the pail from the teat cup group and a suction tube and a pulsing tube leading toward the pail from the suction source and pulsator, the improvement which consists in a cover for the milk pail having two nipples at one side for connection to the milk tube and first mentioned pulsing tube and another pair of nipples for connection to the suction tube and second mentioned pulsing tube, the cover having a channel connecting the two nipples for the pulsing tubes, the cover also having an opening connecting the interior of the pail to the nipple for the suction tube, and another opening connecting the interior of the milk pail to the nipple for the milk tube, a manually operative valve in the last mentioned opening, a second valve operative in both the said channel and the opening to the suction tube nipple for simultaneously closing the channel and this opening, and a check valve normally open by suction and located between the second valve and the suction tube nipple.

6. In a milking apparatus having a conventional milk pail, a pulsator remotely located from the pail, a suction source, and a teat cup group, and a pair of tubes for connection between the teat cup group and pail and another pair of tubes for connection between the pulsator and suction source and the pail, the improvement which consists in a cover for the pail having two sets of connections for the two pairs of tubes, said cover having a channel for connecting the tube leading to the pulsator to one of the tubes leading to the teat cup group, the cover also having two openings for communicating with the interior of the pail and one of said openings communicating with the connection for the tube leading to the suction source and the other opening communicating with the connection for the other tube leading to the teat cup group, separate valves operative to independently close the two openings, and one of the said valves being also operative to close the said channel.

7. In a milking apparatus having a conventional milk pail, a pulsator remotely located from the pail, a suction source, and a teat cup group, and a pair of tubes for connection between the teat cup group and pail and another pair of tubes for connection between the pulsator and suction source and the pail, the improvement which consists in a cover for the pail having two sets of connections for the two pairs of tubes, said cover having a channel for connecting the tube leading to the pulsator to one of the tubes leading to the teat cup group, the cover also having two openings for communicating with the interior of the pail and one of said openings communicating with the connection for the tube leading to the suction source and the other opening communicating with the connection for the other tube leading to the teat cup group, separate valves operative to independently close the two openings, and the valve in the opening leading to the tube for making connection to the suction source being also extended into the said channel to close the same simultaneously.

8. In a milking apparatus having a conventional milk pail, a pulsator remotely located from the pail, a suction source, and a teat cup group, and a pair of tubes for connection between the teat cup group and pail and another pair of tubes for connection between the pulsator and suction source and the pail, the improvement which consists in a cover for the pail having two sets of connections for the two pairs of tubes, said cover having a channel for connecting the tube leading to the pulsator to one of the tubes leading to the teat cup group, the cover also having two openings for communicating with the connection for the tube leading to the suction source and the other opening communicating with the connection for the other tube leading to the teat cup group, separate valves operative to independently close the two openings, the valve in the opening to the connection for the tube leading to the suction source also operating in the said channel to close this opening and the channel simultaneously, and the cover having a generally transversely extending housing on its upper portion containing said channel and the housing portion having enlargements at opposite ends for the said openings, the valves and the tube connections.

ALFRED C. WEIBY.

REFERENCES CITED

The following references are of record in the file of this patent:

UNITED STATES PATENTS

| Number | Name | Date |
|---|---|---|
| 784,780 | Burrell | Mar. 14, 1905 |
| 1,394,433 | Leitch | Oct. 18, 1912 |
| 1,233,668 | Hinman | July 17, 1917 |
| 1,854,305 | Hapgood | Apr. 19, 1932 |

FOREIGN PATENTS

| Number | Country | Date |
|---|---|---|
| 16,201 | Denmark | July 15, 1912 |